United States Patent
Ozdemir et al.

(10) Patent No.: US 9,052,412 B2
(45) Date of Patent: Jun. 9, 2015

(54) DETERMINING AN ORIENTATION ANGLE OF A SURVEY SENSOR

(75) Inventors: Ahmet Kemal Ozdemir, Asker (NO);
Nicolas Goujon, Oslo (NO); Oeyvind Teigen, Slependen (NO); Kenneth E. Welker, Nesoya (NO)

(73) Assignee: WESTERNGECO L.L.C., Houston, TX (US)

( * ) Notice: Subject to any disclaimer, the term of this patent is extended or adjusted under 35 U.S.C. 154(b) by 929 days.

(21) Appl. No.: 13/194,512

(22) Filed: Jul. 29, 2011

(65) Prior Publication Data
US 2013/0028050 A1    Jan. 31, 2013

(51) Int. Cl.
*G01V 1/38* (2006.01)

(52) U.S. Cl.
CPC ............ *G01V 1/3835* (2013.01); *G01V 1/3817* (2013.01)

(58) Field of Classification Search
CPC ............................ G01V 1/3817; G01V 1/3835
USPC ................................. 367/16, 20, 21
See application file for complete search history.

(56) References Cited

U.S. PATENT DOCUMENTS

| | | | |
|---|---|---|---|
| 6,061,298 A * | 5/2000 | Madtson et al. ................. 367/21 |
| 7,656,746 B2 * | 2/2010 | De Kok et al. .................. 367/21 |
| 2006/0133202 A1* | 6/2006 | Tenghamn ....................... 367/24 |
| 2009/0184715 A1* | 7/2009 | Summerfield et al. ........ 324/334 |
| 2010/0103771 A1 | 4/2010 | Gulbransen et al. |
| 2010/0202251 A1 | 8/2010 | Ozdemir et al. |
| 2010/0246322 A1 | 9/2010 | Welker |
| 2011/0007602 A1 | 1/2011 | Welker et al. |
| 2011/0103181 A1 | 5/2011 | Ozdemir et al. |
| 2012/0082000 A1 | 4/2012 | Perciot et al. |

OTHER PUBLICATIONS

International Search Report and Written Opinion issued in PCT/US2012/048443 dated Oct. 25, 2012, 7 pages.

\* cited by examiner

*Primary Examiner* — Ian J Lobo (57) ABSTRACT

Measurement data acquired by at least one sensor in a cable structure towed through a body of water is received. A torsional vibration noise component in the measurement data is estimated. The torsional vibration noise component is used to estimate a rotation angle of the at least one survey sensor with respect to a reference coordinate system of the cable structure.

19 Claims, 7 Drawing Sheets

DETERMINING AN ORIENTATION ANGLE OF A SURVEY SENSOR

BACKGROUND

Survey data can be collected and processed to produce a representation (e.g. image) of a subterranean structure. In some implementations, survey data includes seismic survey data collected using seismic survey equipment. The seismic survey equipment includes one or more seismic sources that are activated to produce seismic waves propagated into the subterranean structure. A part of the seismic waves is reflected from the subterranean structure and detected by seismic sensors that are part of the survey equipment.

Seismic surveying can be performed in a marine environment. Marine survey equipment includes one or more streamers or cables each including seismic sensors. The streamer(s) or cable(s) can be towed through a body of water during the survey operation.

As a streamer or cable is towed, the streamer or cable usually rotates, which can cause the sensors of the streamer or cable to rotate away from a reference coordinate system. If rotation of the streamer or cable is not accounted for, then results obtained from processing measurement data of the sensors of the streamer or cable may not be accurate.

SUMMARY

In general, according to some embodiments, a method is provided to determine an orientation angle of a sensor in a cable structure. The method includes determining first and second angle components of the orientation angle, and aggregating the first and second angle components to derive the orientation angle.

Other or alternative features will become apparent from the following description, from the drawings, and from the claims.

BRIEF DESCRIPTION OF THE DRAWINGS

Some embodiments are described with respect to the following figures.

DETAILED DESCRIPTION

In accordance with some embodiments, techniques or mechanisms are provided to provide an estimate of an orientation angle (which can vary as a function of time) of a seismic sensor arranged in a cable structure that is towed through a body of water for performing marine surveying. Once the orientation angle of the seismic sensor is determined, correction can be applied to measurement data collected by the seismic sensor.

The cable structure carrying the seismic sensor (or seismic sensors) can be a streamer or any other type of cable used for carrying seismic sensors. In the ensuing discussion, reference is made to a streamer. However, note that techniques or mechanisms according to some implementations can also be applied to other types of cable structures.

Figure 1:
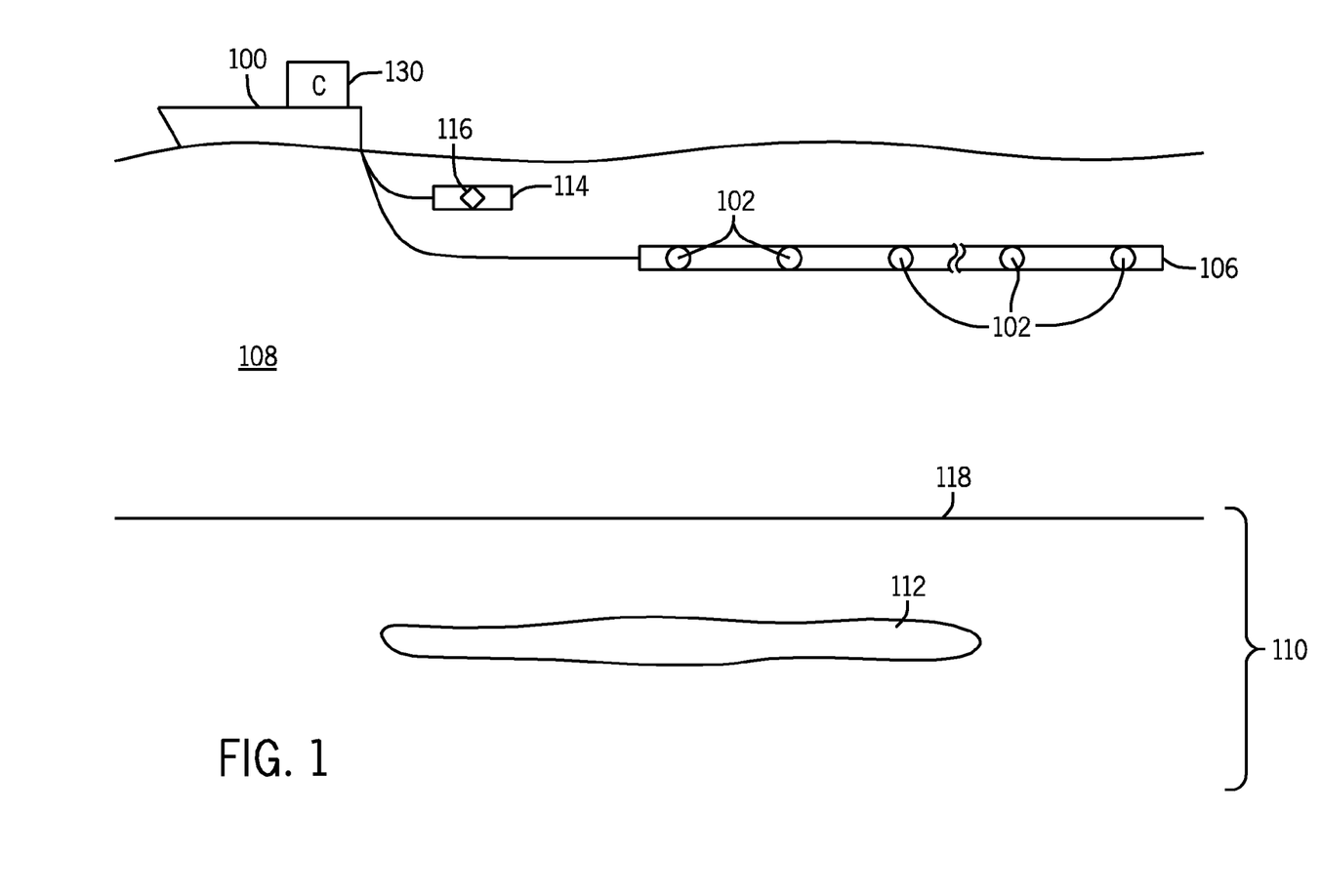
FIG. 1 is a schematic diagram of an example marine survey arrangement for collecting survey data associated with a subterranean structure, in which some embodiments can be incorporated.

FIG. 1 illustrates an example marine survey arrangement that includes a marine vessel 100 for towing a streamer 106 (or multiple streamers) that includes seismic sensors 102. In addition, the marine vessel 100 (or a different marine vessel) can tow a seismic source assembly 114, which has at least one seismic source 116.

The marine vessel 100 tows the streamer 106 and seismic source assembly 114 through a body of water 108 above a bottom surface 118 (e.g. seafloor). A subterranean structure 110 is located below the bottom surface 118, and the subterranean structure 110 includes at least one subterranean element 112 of interest. Examples of the subterranean element 112 can include a hydrocarbon-bearing reservoir, a freshwater aquifer, a gas injection zone, or other subterranean element of interest.

A seismic wave generated by the seismic source 116 is propagated generally downwardly into the subterranean structure 110. A portion of the seismic wave is reflected from the subterranean structure 110, and propagates generally upwardly toward the streamer 106. The upwardly-propagated seismic wave is detected by the seismic sensors 102 of the streamer 106.

FIG. 1 further depicts a controller 130 deployed at the marine vessel 100. The controller 130 can be used to control activation of the seismic source 116. The controller 130 can also receive measurement data collected by the seismic sensors 102. In some examples, the controller 130 is able to process the collected measurement data, such as to develop an image or other representation of the subterranean structure 110. In alternative examples, the collected measurement data from the seismic sensors 102 can be communicated to a remote system for further processing.

Figure 2A:
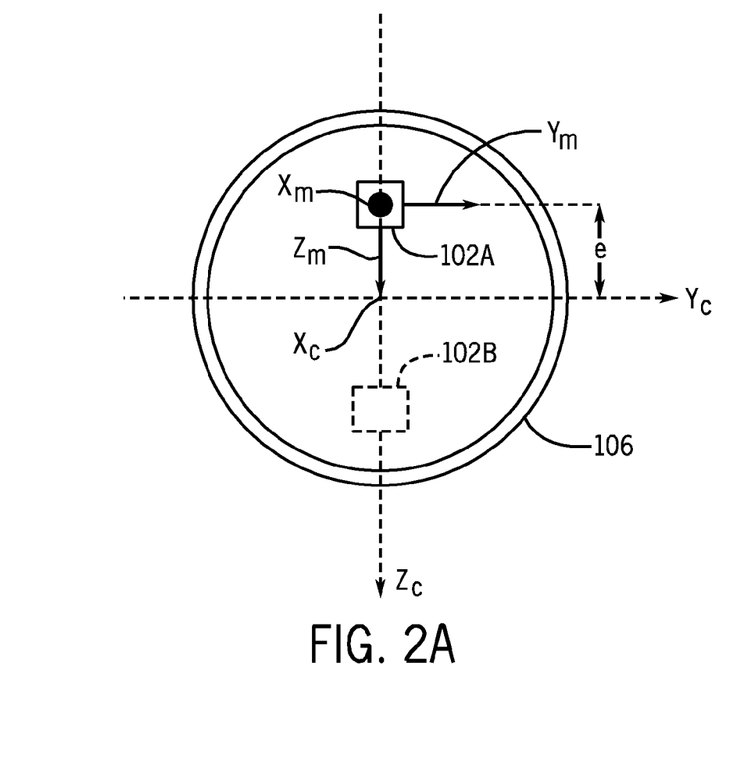
FIGS. 2A-2B are cross-sectional views of a streamer containing seismic sensors, in accordance with some embodiments.
Figure 2B:
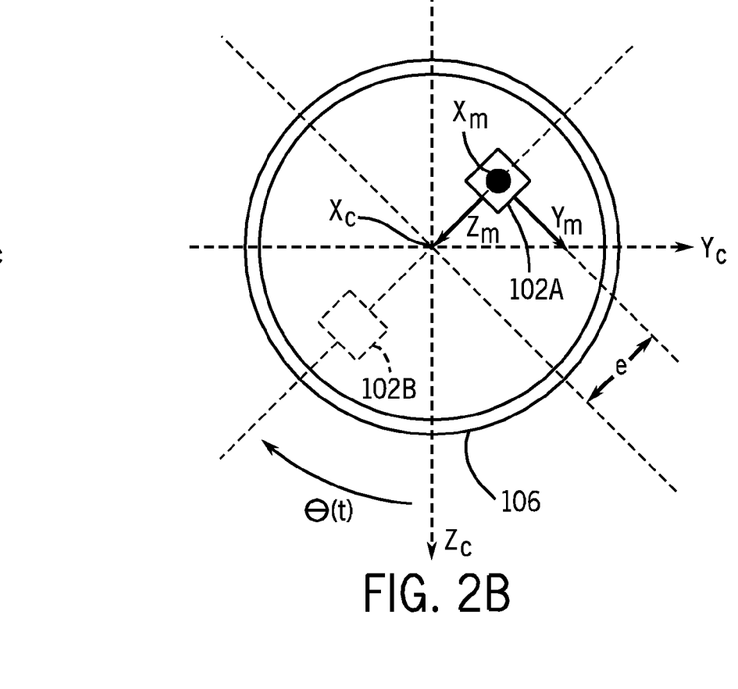

FIGS. 2A-2B are cross-sectional views of the streamer 106. At least one seismic sensor 102A is contained in a housing of the streamer 106, at the inline position corresponding to the cross-section of FIGS. 2A-2B. The seismic sensor 102A is capable of measuring particle motion (acceleration). In some examples, the seismic sensor 102A can include piezoelectric element(s), which is an element formed by a material that exhibits a piezoelectric effect in which electrical charge accumulates in the material in the presence of mechanical strain (such as due to acceleration). In alternative implementations, the seismic sensor 102A can include an optical fiber element (that includes an optical fiber), where the optical fiber measures a phase shift caused by an elongation of the optical fiber due to particle motion (acceleration). Alternatively, the seismic sensor 102A can include an element based on MEMS (microelectromechanical systems) technology. MEMS technology involves use of very small mechanical devices that are driven by electricity. A MEMS sensing element, such as a piezo-resistive MEMS element, can measure acceleration.

In other examples, the seismic sensor 102A can be implemented with other sensing technologies.

As shown in FIG. 2A, the seismic sensor 102A is vertically offset from a center axis of the streamer 106 by a distance e. In other words, rather than placing the seismic sensor 102A at the center of the streamer cross-section shown in FIG. 2A (which corresponds to the position pointed to by $X_c$), the seismic sensor 102A is offset in the vertical direction by e. Other structures, such as electrical conductors or optical fiber cables, can be routed through the center of the streamer 106.

In some examples, another sensor 102B can be positioned at a different position in the streamer cross-section—in the example of FIG. 2A, the sensor 102B is positioned a distance e below the center axis of the streamer cross-section. In some examples, the sensor 102A and sensor 102B are spaced apart from each other along the longitudinal (inline) direction of the streamer 106 (the longitudinal direction is the direction perpendicular to each of the $Z_c$ and $Y_c$ directions shown in FIG. 2A—the longitudinal direction is parallel to $X_c$). The inline direction is the direction of motion of the streamer 106. In other examples, the sensor 102A and sensor 102B can both be located at the same inline position of the streamer 106.

In FIG. 2A, data in a reference coordinate system is represented by ($X_c$, $Y_c$, $Z_c$), where $X_c$, $Y_c$, and $Z_c$ represent data along three orthogonal axes. The reference coordinate system refers to the coordinate system of the streamer 106 at an initial position prior to rotation of the streamer 106. In the initial position of the streamer 106, the sensor measurement data ($X_m$, $Y_m$, $Z_m$) along the three respective orthogonal axes (x, y, and z, respectively), are aligned with the reference coordinate system. If (x, y, z) is considered the sensor coordinate system, then at the initial position of FIG. 2A, the sensor coordinate system (x, y, z) is aligned with the reference coordinate system. In this initial position, the x axis is the inline direction (direction of motion of the streamer 106), the y axis is the cross-line direction, and the z axis is the vertical direction.

The z component of the data ($Z_c$) in the reference coordinate system can be represented in terms of a signal term $Z_s$, noise term $Z_n$ and the gravitational acceleration term g. Noise here means all sources of streamer noise, including translational noise, instrument noise, torsional noise, and/or any other noise. $Z_c$ is expressed as follows:

$$Z_c = Z_s + Z_n + g. \quad \text{(Eq. 1)}$$

They component of the data ($Y_c$) in the reference coordinate system can be represented in terms of a signal term $Y_s$ and a noise term $Y_n$:

$$Y_c = Y_s + Y_n. \quad \text{(Eq. 2)}$$

Since they component is horizontal in the reference coordinate system, no gravitational acceleration is picked by this component. Note, however, that the sensor coordinate system (x, y, z) can be rotated and thus become mis-aligned with the reference coordinate system.

Since there is an offset e between the seismic sensor 102A and the center axis of the streamer 106, rotation of the streamer 106, as shown in FIG. 2B, causes the sensor measurement data ($X_m$, $Y_m$, $Z_m$) to be rotated by a corresponding angle $\Theta(t)$, which changes as a function of time due to rotation of the streamer 106 as the streamer 106 is towed through a body of water. The representation of the data in the rotated coordinate system is given as $$Z_m = Z_c \cos\Theta - Y_c \sin\Theta \quad \text{(Eq. 3)}$$
$$= (Z_s + Z_n)\cos\Theta - (Y_s + Y_n)\sin\Theta + g\cos\Theta,$$

$$Y_m = Z_c \sin\Theta + Y_c \cos\Theta \quad \text{(Eq. 4)}$$
$$= (Z_s + Z_n)\sin\Theta + (Y_s + Y_n)\cos\Theta + g\sin\Theta.$$

In general, the orientation angle $\Theta(t)$ is composed of two components: a slowly varying angle component $\theta(t)$ and a rapidly varying angle component $\phi(t)$. The slowly varying angle component $\theta(t)$ varies at a slower rate (over time) as compared to the rapidly varying angle component $\phi(t)$. The slowly varying component $\theta(t)$ is aggregated with the rapidly varying angle component $\phi(t)$ to provide the orientation angle $\Theta(t)$, where the aggregating can be a sum as represented below:

$$\Theta(t) = \theta(t) + \phi(t). \quad \text{(Eq. 5)}$$

Figure 3A:
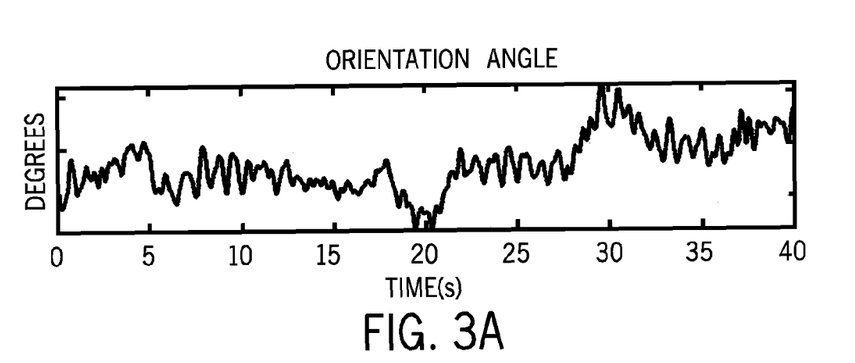
FIG. 3A depicts an orientation angle of a seismic sensor as a function of time.
Figure 3B:
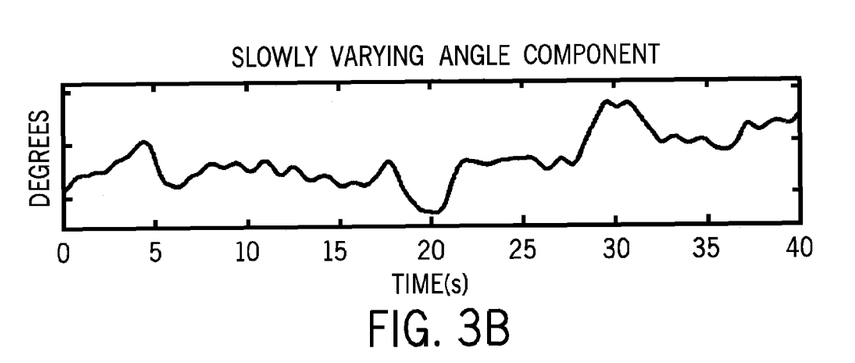
FIG. 3B illustrates a slowly varying angle component of the orientation angle as a function of time.
Figure 3C:
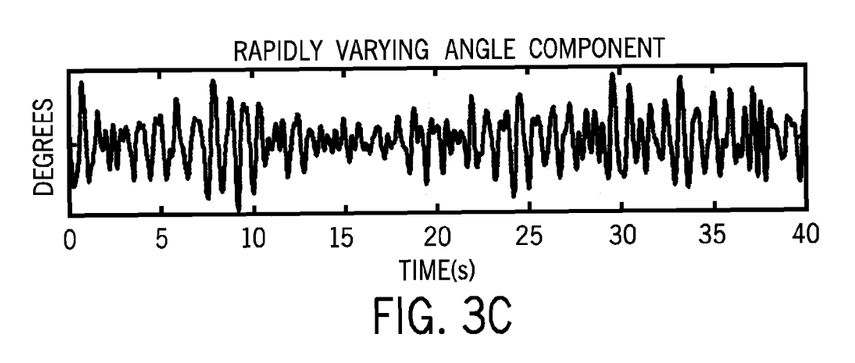
FIG. 3C depicts a rapidly varying angle component of the orientation angle as a function of time.

FIG. 3A shows an example of the orientation angle $\Theta(t)$ as a function of time. FIG. 3B shows the slowly varying angle component $\theta(t)$ as a function of time, and FIG. 3C shows the rapidly varying angle component $\phi(t)$ as a function of time. The value of the slowly varying angle component $\theta(t)$ can range between 0 and 360°, whereas the value of the rapidly varying angle component $\phi(t)$ is usually limited to a range of a few degrees (e.g. a range of 5° or less, a range of 10° or less, etc.). Furthermore, an analysis of a spectrogram of the seismic data collected by the sensor 102A (or 102B) may show that the spectral content of the slowly varying angle component $\theta(t)$ is limited to a frequency range between 0 (DC) and about 0.5 Hz (or some other upper value such as 1 Hz, 5 Hz, etc.). The slowly varying angle component $\theta(t)$ having spectral content in a limited, low frequency range means that the slowly varying angle component $\theta(t)$ has significant values within the limited frequency range, but smaller values (close to zero) at frequencies outside the limited frequency range.

Summing the slowly varying angle component $\theta(t)$ of FIG. 3B with the rapidly varying angle component $\phi(t)$ of FIG. 3C results in the orientation angle $\Theta(t)$ of FIG. 3A.

To be able to correct for the orientation of the seismic sensor 102A (and 102B) (in other words, to rotate measurement data of the seismic sensor 102A and/or 102B based on the orientation angle of the sensor relative to the reference coordinate system), both components $\theta(t)$ and $\phi(t)$ of the orientation angle $\Theta(t)$ are estimated. The slowly varying angle component $\theta(t)$ can be estimated by applying a narrow-band high-cut filter (low-pass filter) to the sensor $Y_m$ and $Z_m$ measurement data, and computing the arc tangent of the filtered data as follows:

$$Z_{m,LP}(t) = \int Z_m(t-\tau) h_{LP}(\tau) d\tau, \quad \text{(Eq. 6)}$$

$$Y_{m,LP}(t) = \int Y_m(t-\tau) h_{LP}(\tau) d\tau, \quad \text{(Eq. 7)}$$

$$\theta(t) = \arctan(Y_{m,LP}(t), Z_{m,LP}(t)). \quad \text{(Eq. 8)}$$

In Eqs. 6 and 7 above, $Z_m$ represents the sensor measurement data along the z axis, $Y_m$ represents the sensor measurement data along they axis, $h_{LP}(\tau)$ represents the low-pass filter, $Y_{m,LP}$ represents the low-pass filtered data along the y axis, $Z_{m,LP}$ represents the low-pass filtered data along the z axis, and r represents an intermediate variable of integration. Eq. 6 applies the low-pass filter $h_{LP}(\tau)$ to the vertical measurement data $Z_m$, while Eq. 7 applies the low-pass filter $h_{LP}(\tau)$ to the cross-line measurement data $Y_m$. Eq. 8 computes the slowly varying angle component $\theta(t)$ by taking the arc tangent of the filtered measurement data computed in Eqs. 6 and 7.

The low-pass filter $h_{LP}(\tau)$ has a predefined cutoff frequency (e.g. 0.5 Hz or other cutoff frequency). The cutoff frequency of the low-pass filter should be chosen large enough to capture the DC (frequency or f=0) component, and small enough to avoid picking other noise or data sources (e.g. translational acceleration, swell noise, seismic signal, etc.).

Further details regarding determining the cutoff frequency of the low-pass filter $h_{LP}(\tau)$ are discussed further below.

Figure 4A:
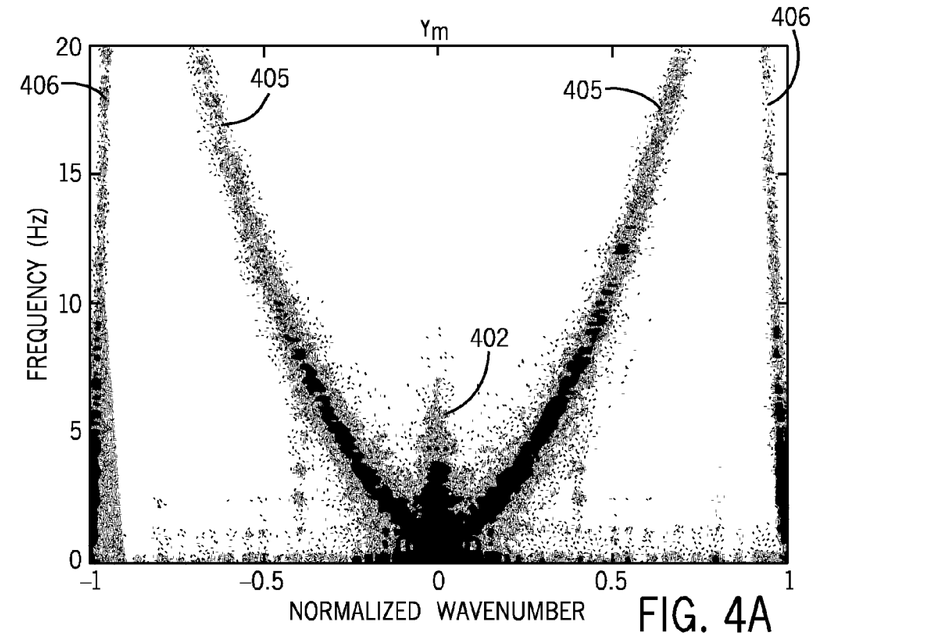
FIGS. 4A-4B, 5A-5B, and 6A-6B are graphs to illustrate FK (frequency-wavenumber) spectra of Y and Z components of measured data.
Figure 4B:
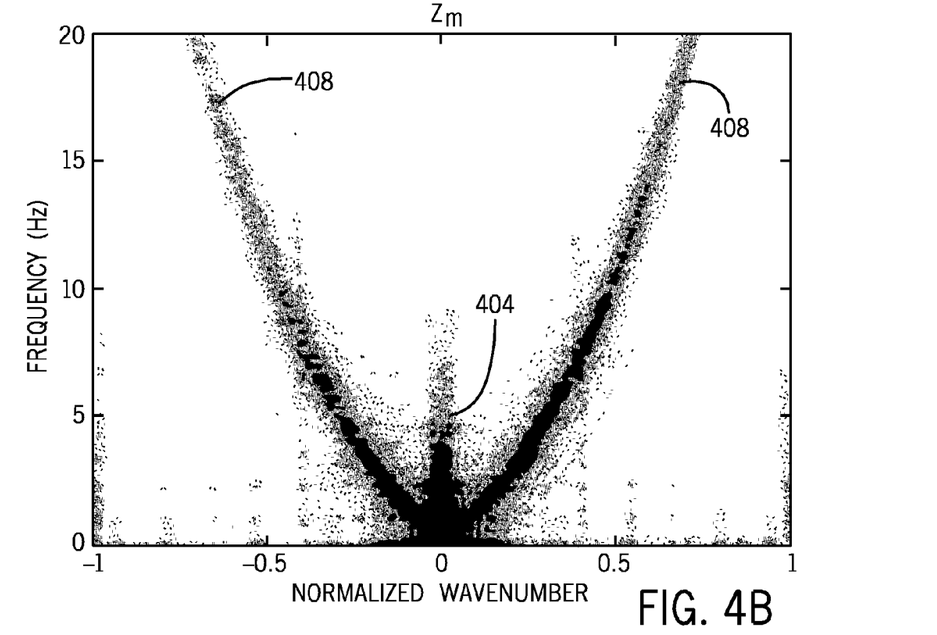

FIGS. 4A-4B depict the FK (frequency-wavenumber) spectra of unrotated $Y_m$ and $Z_m$ measurement data in the sensor coordinate system. "Wavenumber" is the reciprocal of wavelength. As shown in each of FIGS. 4A-4B, noise components 402 and 404 appear in both the $Y_m$ and $Z_m$ measurement data, respectively, at frequencies close to normalized wavenumber zero. The noise components 402 and 404 are caused by the fact that the measurement data have not been corrected for the orientation angle $\Theta(t)$.

FIG. 4A also shows translational vibration noise components 405 and torsional vibration noise components 406 in the $Y_m$ measurement data. Translational vibration noise refers to vibration of the streamer 106 caused by transverse strain applied on the streamer 106. Torsional vibration noise refers to noise applied to the streamer 106 caused by strain due to twisting of the streamer 106. The translational and vibration noise can also be detected by the sensors of the streamer 106. FIG. 4B also shows translation vibration noise components 408 in the unrotated $Z_m$ measurement data.

Figure 5A:
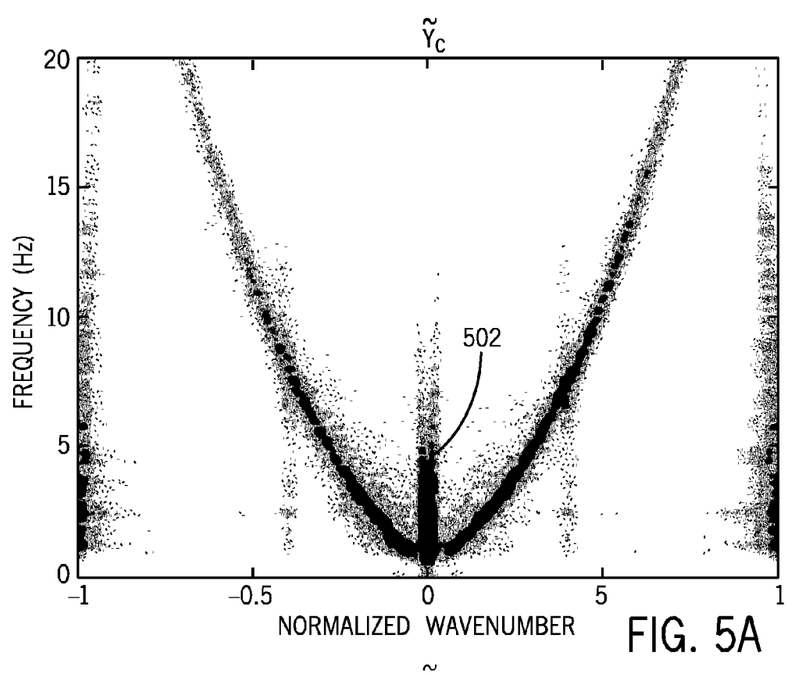
Figure 5B:
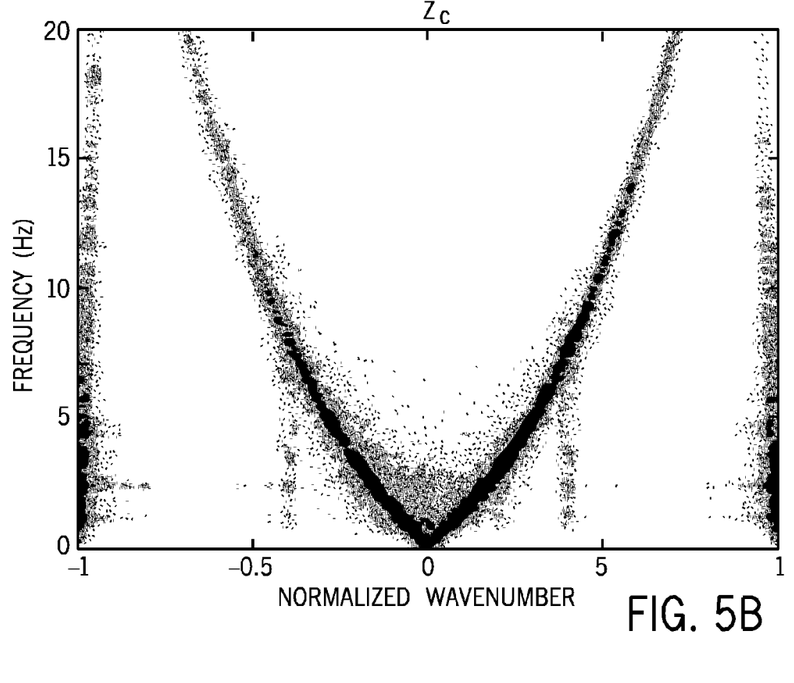

FIGS. 5A-5B are graphs depicting the FK spectra of partially rotated $\tilde{Y}_c$ and $\tilde{Z}_c$ measurement data in the sensor coordinate system. The partially rotated data ($\tilde{Y}_c$ and $\tilde{Z}_c$) refers to acquired $Y_m$ and $Z_m$ measurement data rotated by just the slowly varying angle component $\theta(t)$, and not by the rapidly varying angle component $\phi(t)$.

If the acquired measurement data is partially rotated by using the slowly varying angle component $\theta(t)$, then the following partially rotated measurement data (represented as $\tilde{Z}_c$ and $\tilde{Y}_c$, respectively), are obtained as follows:

$$\tilde{Z}_c = Z_m\cos\theta(t) + Y_m\sin\theta(t) \quad \text{(Eq. 9)}$$
$$= (Z_s + Z_n)\cos\phi(t) + (Y_s + Y_n)\sin\phi(t) + g\cos\phi(t)$$

$$\tilde{Y}_c = Z_m\sin\theta(t) + Y_m\cos\theta(t) \quad \text{(Eq. 10)}$$
$$= -(Z_s + Z_n)\sin\phi(t) + (Y_s + Y_n)\cos\phi(t) + g\sin\phi(t)$$

Since $\phi(t)\ll 1$, when $\phi(t)$ has the unit of radians, the following approximation can be made:

$$\tilde{Z}_c \cong (Z_s+Z_n)+(Y_s+Y_n)\phi(t)+g \quad \text{(Eq. 11)}$$

$$\tilde{Y}_c \cong (Y_s+Y_n)-(Z_s+Z_n)\phi(t)+g\phi(t) \quad \text{(Eq. 12)}$$

The magnitude of the gravity vector (g) is several orders of magnitude larger than signal or noise detected by seismic sensors. Therefore even for small values of $\phi(t)$, the term $g\phi(t)$ may have large values relative to other signal or noise sources.

In the partially rotated cross-line and vertical measurement data ($\tilde{Y}_c$ and $\tilde{Z}_c$, respectively) rotated by using the estimated slowly varying angle component $\theta(t)$, it can be seen from FIGS. 5A-5B that the FK spectra of the rotated components ($\tilde{Y}_c$ and $\tilde{Z}_c$) indicate that the $\tilde{Y}_c$ component includes relatively strong low-frequency, low-wavenumber noise (indicated by noise component 502 in FIG. 5A). This noise term is expressed as $g\phi(t)$ in Eq. 12. Note, however, that the low-frequency, low-wavenumber noise has been removed from the partially rotated $\tilde{Z}_c$ measurement data.

As FIGS. 5A-5B show, when the orientation of the streamer 106 is partially corrected, the static gravity measurement appears as a strong noise source (502 in FIG. 5A) on the rotated component ($\tilde{Y}_c$). Hence, to obtain accurate results, the rapidly varying angle component of the orientation angle should also be estimated and corrected for. In other words, correcting the measurement data just for the slowly varying angle component $\theta(t)$ is insufficient.

In accordance with some embodiments, the rapidly varying angle component $\phi(t)$ of the orientation angle $\Theta(t)$ is estimated using the torsional vibration noise (depicted as 406 in the FK spectra of FIG. 4A), which is proportional to the angular acceleration:

$$\tau(t)=e\ddot{\Theta}(t)\cong e\ddot{\phi}(t). \quad \text{(Eq. 13)}$$

In Eq. 13, e is the distance of the sensor to the cable center (see FIGS. 2A-2B) and $\ddot{\Theta}$ is the angular acceleration (acceleration in the angular direction of the streamer 106). Due to particular arrangement of the $Y_m$ and $Z_m$ components as shown in FIGS. 2A-2B, the torsional vibration noise is present in the local $Y_m$ component. The sensors 102A and 102B placed at opposite sides of the streamer 106 will detect the torsional vibration noise with opposite polarity. Hence, in a dual section network (a network of sensors in which one subset of the sensors are placed on a first side of the streamer 106 and another subset of the sensors are placed on another side of the streamer 106), the measurement of the torsional vibration noise is modulated as follows:

$$Y_{m,n}(t)=(-1)^n\tau_n(t)+\overline{Y}_{m,n}(t), \quad \text{(Eq. 14)}$$

where n=1, 2, ... represent the index of the sensors, $Y_{m,n}(t)$ represents the $Y_m$ component recorded by n-th sensor, $\tau_n(t)$ represents the torsional vibration noise on n-th sensor, and $\overline{Y}_{m,n}(t)$ represents all other noise and signal terms on the measurement. In the example of FIGS. 2A-2B, the sensor 102A is part of the first subset and the sensor 102B is part of the second subset. FIG. 4A shows that, as a result of this modulation, the torsional vibration noise starts at the Nyquist wavenumber at zero frequency. Consequently, at the frequency range of interest, the torsional vibration noise is relatively far (in terms of wavenumber) from translational vibration noise and signal components (for example, in FIG. 4A, there is substantial separation between the torsional vibration noise components 406 and the translational vibration noise components 404).

The torsional vibration noise can be estimated with the following two tasks: (1) the polarity of every second local $Y_m$ measurement data is flipped (to correct the polarity of the torsional vibration noise); and (2) a k filter is applied to remove the signal and the translational vibration noise:

$$\tau_n(t) = \sum_{n'} (-1)^{n-n'} Y_{m,n-n'}(t)h_k(n'), \quad \text{(Eq. 15)}$$

In Eq. 15, $h_k(n)$ represents the coefficients of the k filter; n=1, 2, ... represent the index of the sensors, $Y_{m,n}(t)$ represents the $Y_m$ measurement recorded by n-th sensor, and n' is the variable of summation.

The k filter can be implemented with a filter with predefined cutoff wavenumbers to filter out the components at wavenumbers corresponding to the signal and translational vibration noise components (404, 408 in FIGS. 4A-4B). Effectively, the k filter removes components in a predefined range of wavenumbers. After application of the k filter, the remaining components include the torsional vibration noise components but not the signal components and the translational vibration noise components.

Once the torsional vibration noise has been estimated, the rapidly varying angle component ($\phi(t)$) of the orientation angle is computed by integration in time (t):

$$\dot{\phi}(t) = \frac{1}{e}\int_0^t \tau(t')dt', \; \phi(t) = \int_0^t \dot{\phi}(t')dt'. \quad \text{(Eq. 16)}$$

After computing both angle components $\theta(t)$ and $\phi(t)$ of the orientation angle, they are summed to obtain the full orientation angle:

$$\Theta(t)=\theta(t)+\phi(t). \quad \text{(Eq. 17)}$$

Figure 6A:
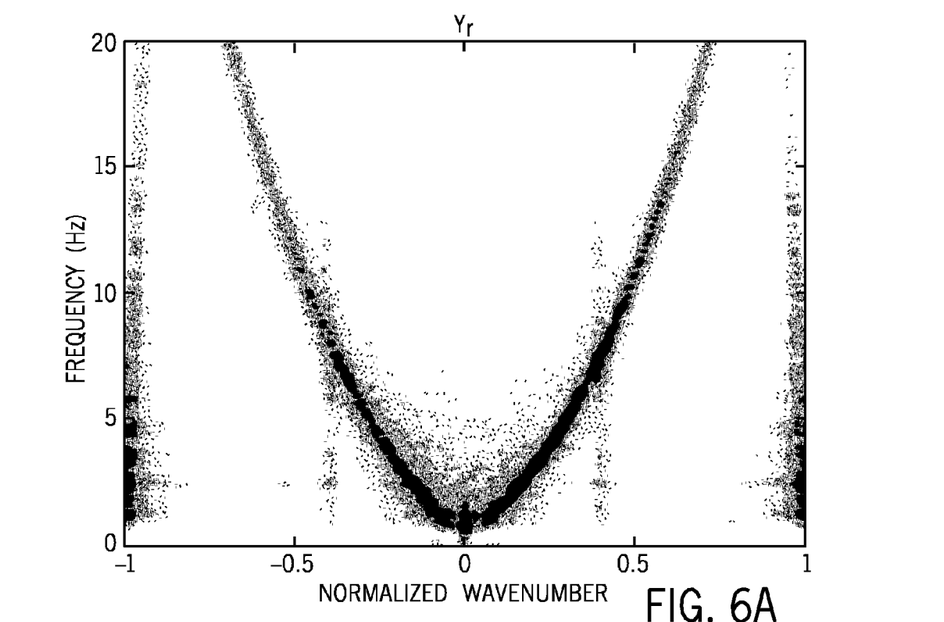
Figure 6B:
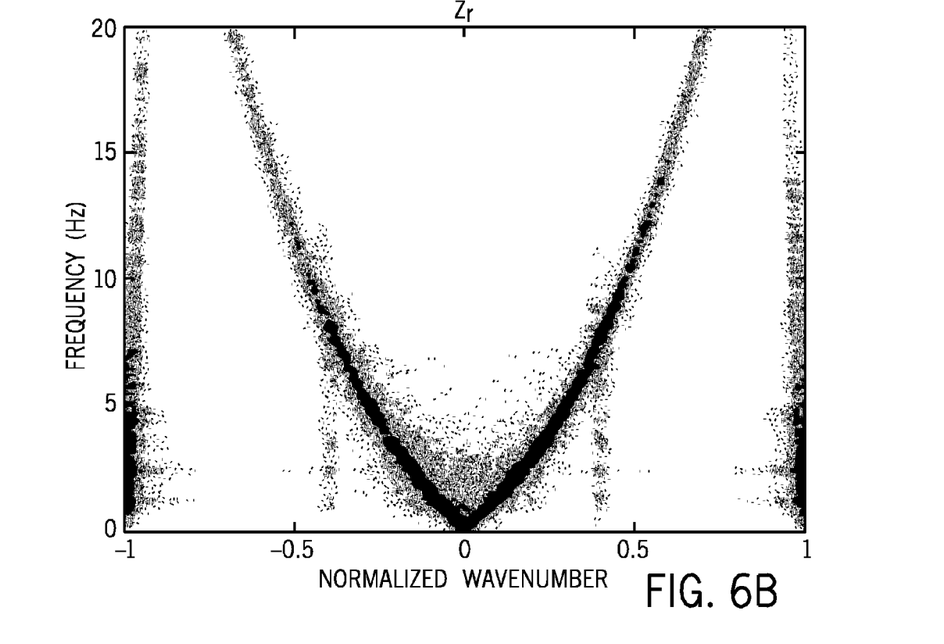

Then the acquired measurement data is rotated, by using the full orientation angle $\Theta(t)$. FIGS. 6A-6B show the FK spectra of the cross-line and vertical measurement data rotated by the full orientation angle $\Theta(t)$ (the fully rotated measurement data is represented by $Y_r$ and $Z_r$). The fully rotated measurement data $Y_r$ and $Z_r$ are aligned with the reference coordinate system ($X_c, Y_c, Z_c$). It can be seen that the g$\phi$(t) noise term (502 in FIG. 5A), as expressed in Eq. 12 above, has disappeared after the measurement data has been fully rotated by using an accurate orientation angle, $\Theta(t)$. In this manner, the Y and Z components will have similar noise levels—otherwise, the Y component will be significantly noisier than the Z component.

Figure 7:
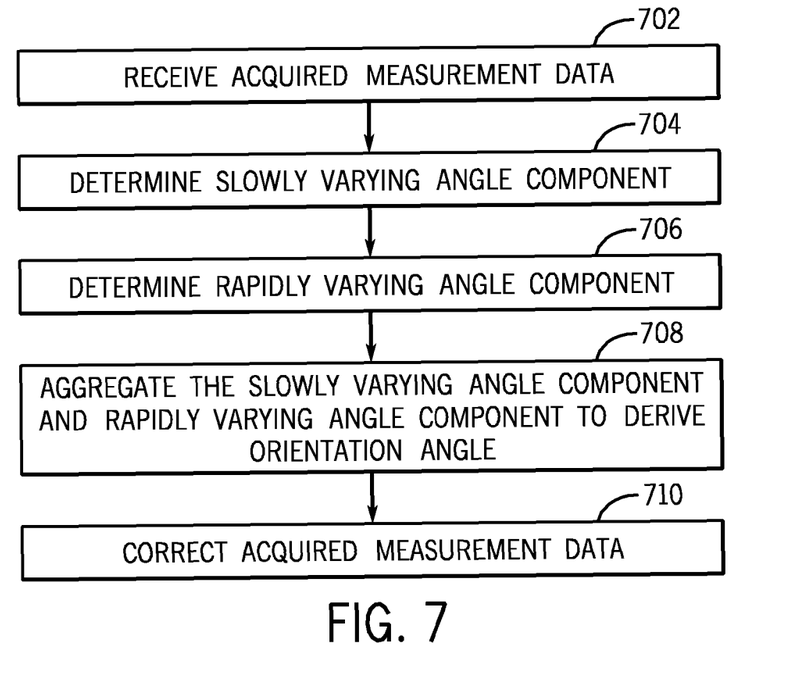
FIG. 7 is a flow diagram of a process according to some embodiments.

FIG. 7 is a flow diagram of a process according to some embodiments. The process of FIG. 7 can be performed by the controller 130 of FIG. 1, or by another system. Measurement data (as acquired by the survey arrangement of FIG. 1) is received (at 702). The process next determines (at 704) the slowly varying angle component $\theta(t)$, such as by use of Eqs. 6-8 discussed above. The process also determines (at 706) the rapidly varying angle component $\phi(t)$ using Eq. 16. As discussed above, this determination of the rapidly varying angle component $\phi(t)$ is based on first computing the torsional rotation according to Eq. 15.

Once both the slowly and rapidly varying angle components $\theta(t)$ and $\phi(t)$ have been determined, the angle components are aggregated (at 708) (e.g. summed according to Eq. 17) to derive the orientation angle $\Theta(t)$.

Then, using the derived orientation angle $\Theta(t)$, the acquired measurement data is corrected (at 710), such as by rotating the acquired measurement data.

$$Z_r = Z_m\cos\Theta(t) + Y_m\sin\Theta(t) \quad \text{(Eq. 18)}$$
$$= Z_s + Z_n + g$$

$$Y_r = -Z_m\sin\Theta(t) + Y\cos\Theta(t) \quad \text{(Eq. 19)}$$
$$= Y_s + Y_n$$

As discussed above, a low-pass filter $h_{LP}(\tau)$ is used in Eqs. 6-8 to compute the slowly varying angle component $\theta(t)$. To determine the cutoff frequency of the low-pass filter, a frequency range of the slowly varying angle component is determined, which can be based on a real-time estimation of the frequency content of the measurement data computed using time-varying Fourier analysis to produce a spectogram or using the Kalman equations to obtain a Fourier analysis.

In some examples, the Fourier analysis involves computing amplitude coefficients for the sine and cosine terms (at respective different frequencies) of the measured acceleration data from near zero to an upper frequency limit based on prior knowledge of the upper limit. The computation of the amplitude coefficients for the sine and cosine terms can be accomplished using the Kalman equations in real time with a one-way estimate or in near real-time with a forward/backward Kalman estimation. The forward/backward estimate first computes the amplitude coefficients working forward, and then works backwards to get a second set of estimates, then combines the two sets of estimates in a type of weighted mean. The forward/backward estimate can have the benefit of not lagging to follow any frequency shifts of the slowly varying angle component. In addition to the amplitude coefficients, an error term is included that absorbs all non-modeled frequency information above the high end of the frequencies modeled.

In alternative implementations of the Fourier analysis, all measurable frequencies can be modeled with the understanding that frequencies above the slowly varying portion of the acceleration can be modeled but not separated in the frequency domain. This approach can have the benefit of finding both the slowly varying frequency upper limit and the higher frequency torsional and translational modes even if they are not distinguishable in the frequency domain.

According to alternative implementations, a solution for estimating well-separated components of the orientation angle $\Theta(t)$ is with Fourier decomposition in the wavenumber space. As shown in an FK plot for Y measurements (such as shown in FIG. 4A, 5A, or 6A), the wavenumbers are different for the torsional and translational vibration noise components of the high-frequency accelerations. With a priori knowledge of the wavenumber ranges of these various components, all three components (signal components, translational vibration noise components, and torsional vibration noise components) can be estimated in real or near real time. As discussed above, k filters for the unwanted components (signal components and translational vibration noise components) can be applied to remove the unwanted components.

In further alternative embodiments, a Kalman filtering approach can be used. The Kalman filtering approach generally refers to an approach in which measurements over time are acquired, where the measurements contain noise and other inaccuracies. The Kalman filtering approach then predicts values that tend to be closer to the true values—based on differences between predicted and measured values, the measured values can be updated.

The Kalman filtering approach according to some embodiments starts with a first estimate of the rotational angles or angular accelerations. Kalman equations can be initiated to update the estimated rotational angles or angular accelerations based on signal input k filtered to remove translational vibration noise. A model that can be used is one that first estimates an angle and then subsequent angular accelerations, after which the estimated angle and angular accelerations are applied over time periods.

Random rotations can cause the $Z_m$ and $Y_m$ measurement data to achieve vertical and cross-line directions, respectively, which results in zero on $Y_m$ and g on $Z_m$. The residual between what is estimated and what is measured can be used to re-calibrate the estimation process. This technique assumes there will not be a measurement event where noise on $Z_m$ and $Y_m$ simultaneously cancel to give apparent but truth. Alternatively, with no starting rotation angle, the streamer can be rotated with steering birds to find vertical $Z_m$ and zero $Y_m$ for some period of time for which the noise can average to zero.

In both cases for estimating the rotation angle, either using an estimate or physically searching for a known orientation, a state vector for the Kalman equations can contain the angle, angular velocity, and the angular acceleration. The evolution of the state vector can be written as $$\begin{bmatrix} \Theta_{i-1} \\ \dot{\Theta}_{i-1} \\ \ddot{\Theta}_{i-1} \end{bmatrix} = \begin{bmatrix} 1 & \Delta t & (\Delta t)^2/2 \\ 0 & 1 & \Delta t \\ 0 & 0 & 1 \end{bmatrix} \begin{bmatrix} \Theta_i \\ \dot{\Theta}_i \\ \ddot{\Theta}_i \end{bmatrix} + \begin{bmatrix} w_{1i} \\ w_{2i} \\ w_{3i} \end{bmatrix}$$ (Eq. 20)

where i represents the time step, $\Delta t$ represents the sampling interval in time, and $w_{1i}, w_{2i}, w_{3i}$ represent the process noises. The measurement model can contain a cosine of the orientation angle ($Z_m$ component in Eq. 3), the sine of the orientation angle ($Y_m$ component in Eq. 4), and the angular acceleration (the torsional component, Eqs. 13 and 15):

$$\begin{bmatrix} Y_{m,i} \\ Z_{m,i} \\ \tau_{m,i} \end{bmatrix} = \begin{bmatrix} g\sin\Theta_i \\ g\cos\Theta_i \\ e\ddot{\Theta}_i \end{bmatrix} + \begin{bmatrix} q_{1i} \\ q_{2i} \\ q_{3i} \end{bmatrix}$$ (Eq. 21)

where $q_{1i}, q_{2i}, q_{3i}$ represent measurement noises. Since the measurement model is non-linear, in this example, extended Kalman equations can be used. Alternatively, the measurement model can be defined as the angle (the arc tangent of $Y_m$ and $Z_m$ components) and the angular acceleration (the torsional component). In this case, the measurement model is linear; hence, a standard Kalman filter can be used. Relating the $Z_m$ and $Y_m$ estimates adds information to the estimation process by physically coupling them in the sensor. A constraint term that forces $Y_m$ to zero when $Z_m$ is g will provide the coupling.

The accuracy of various techniques according to some embodiments can be improved by using the information that a solid streamer has a high rotational stiffness and therefore the orientation angle, angular velocity and angular acceleration of adjacent sensors are highly correlated. As an example, a twist created by a steering bird will propagate through a section of the streamer. It is possible to model the maximum amount of change in the orientation as a function of inline offset, and use this information to filter the orientation angle estimates in space. In this way, noise on orientation angle estimates can be reduced and the accuracy of the orientation angle estimates is improved.

Figure 8:
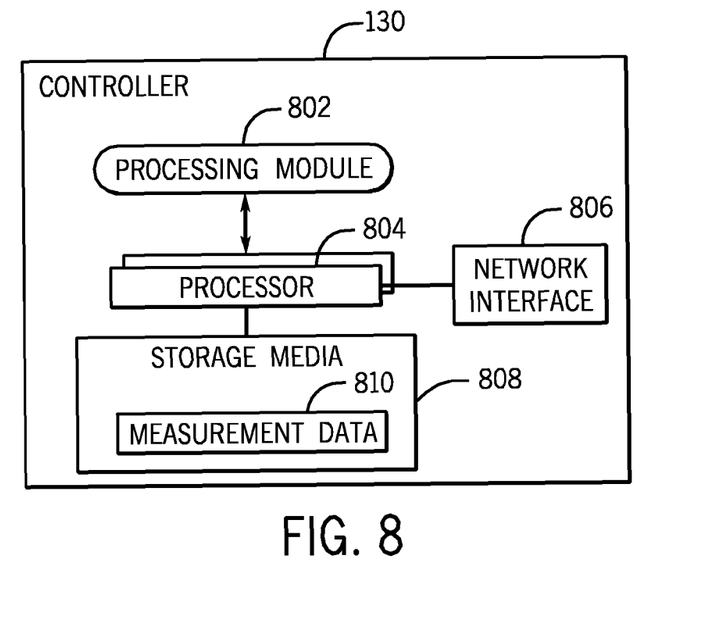
FIG. 8 is a block diagram of an example controller according to some embodiments.

FIG. 8 is a block diagram of an example controller 130. The controller 130 includes a processing module 802, which can perform various techniques discussed above. The processing module 802 is executable on one or more processors 804, which are connected to storage media 808 and a network interface 806. The network interface 806 allows the controller 130 to communicate over a network. The storage media 808 can store measurement data 810, such as the measurement data acquired by a survey arrangement.

Machine-readable instructions of the processing module 802 are executable on the processor(s) 804. A processor can include a microprocessor, microcontroller, processor module or subsystem, programmable integrated circuit, programmable gate array, or another control or computing device.

The storage media 808 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   determining, by a system comprising a processor, a first orientation angle component of an orientation angle relating to angular rotation of a sensor with respect to a reference coordinate system;
   determining, by the system, a second orientation angle component of the orientation angle based on estimating torsional vibrational noise in measurement data, wherein the second orientation angle component varies at a higher rate than the first orientation angle component; and
   aggregating, by the system, the first and second orientation angle components to provide the orientation angle.

2. The method of claim 1, wherein aggregating the first and second orientation angle components is based on summing the first and second orientation angle components.

3. The method of claim 1, further comprising estimating the torsional vibration noise based on angular acceleration.

4. The method of claim 1, further comprising applying a filter to remove a signal component and a translational vibration noise component in the measurement data, wherein applying the filter allows the torsional vibration noise to be estimated.

5. The method of claim 4, wherein applying the filter comprises applying the filter to remove components at a predefined range of wavenumbers.

6. The method of claim 1, wherein determining the first orientation angle component comprises:
   applying a low-pass filter to the measurement data to form filtered measurement data.

7. The method of claim 6, wherein applying the low-pass filter to the measurement data comprises:
   applying the low-pass filter to measurement data along a first direction; and
   applying the low-pass filter to measurement data along a second direction that is orthogonal to the first direction.

8. The method of claim 6, further comprising:
   computing an arc tangent of the filtered measurement data to derive the first orientation angle component.

9. The method of claim 6, further comprising:
   applying Fourier analysis to determine a cutoff frequency of the low-pass filter.

10. The method of claim 1, further comprising correcting the measurement data for the orientation angle by rotating the measurement data based on the orientation angle.

11. The method of claim 1, further comprising:
receiving the measurement data collected by at least one survey sensor; and
correcting the measurement data using the orientation angle.

12. The method of claim 1, further comprising towing a streamer including the at least one survey sensor.

13. A system comprising:
a storage medium to store measurement data acquired by at least one sensor in a subterranean survey operation, wherein the at least one sensor is in a cable structure for towing through a body of water;
at least one processor to:
determine a first orientation angle component of an orientation angle relating to angular rotation of the at least one sensor with respect to a reference coordinate system;
determine a second orientation angle component of the orientation angle based on estimating torsional vibrational noise in the measurement data, wherein the second orientation angle component varies over time at a higher rate than the first orientation angle component; and
aggregate the first and second orientation angle components to provide the orientation angle.

14. The system of claim 13, wherein the estimating of the torsional vibration noise is based on angular acceleration.

15. The system of claim 13, wherein the at least one processor is to apply a filter to remove a signal component and a translational vibration noise component at a predefined range of wavenumbers in the measurement data, the estimating of the torsional vibration noise based on applying the filter.

16. The system of claim 13, wherein the determining of the first orientation angle component comprises:
applying a low-pass filter to the measurement data to form filtered measurement data.

17. The system of claim 16, wherein the at least one processor is to further:
compute an arc tangent of the filtered measurement data to derive the first orientation angle component.

18. An article comprising at least one non-transitory machine-readable storage medium storing instructions that upon execution cause a system to:
receive measurement data acquired by at least one sensor in a cable structure towed through a body of water;
determine a first orientation angle component of an orientation angle relating to angular rotation of the at least one sensor with respect to a reference coordinate system;
determine a second orientation angle component of the orientation angle based on estimating torsional vibrational noise in the measurement data, wherein the second orientation angle component varies at a higher rate over time than the first orientation angle component; and
aggregate the first and second orientation angle components to provide the orientation angle.

19. The article of claim 18, wherein the instructions upon execution cause the system to further rotate the measurement data based on the orientation angle.

* * * * *